(12) United States Patent
Kumar Mishra et al.

(10) Patent No.: US 12,170,608 B2
(45) Date of Patent: Dec. 17, 2024

(54) LINK BEHAVIOR PREDICTION FOR USE IN PATH SELECTION

(71) Applicant: Juniper Networks, Inc., Sunnyvale, CA (US)

(72) Inventors: Sanjeev Kumar Mishra, Bangalore (IN); Sabyasachi Mukhopadhyay, Bangalore (IN); Shivaprasad Gali, Bangalore (IN); Hsiuyen Tsai, Edison, NJ (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 17/808,066

(22) Filed: Jun. 21, 2022

(65) Prior Publication Data

US 2023/0412488 A1 Dec. 21, 2023

(51) Int. Cl.
*H04L 45/42* (2022.01)
*H04L 41/16* (2022.01)
*H04L 45/02* (2022.01)
*H04L 45/12* (2022.01)

(52) U.S. Cl.
CPC ............ *H04L 45/123* (2013.01); *H04L 45/08* (2013.01); *H04L 45/124* (2013.01)

(58) Field of Classification Search
CPC ...... H04L 45/123; H04L 45/08; H04L 45/124
See application file for complete search history.

(56) References Cited

U.S. PATENT DOCUMENTS

| 5,987,442 | A | 11/1999 | Lewis et al. |
| 6,353,902 | B1 * | 3/2002 | Kulatunge ............ H04L 41/149 714/48 |
| 8,255,351 | B2 | 8/2012 | Lee et al. |
| 8,693,374 | B1 * | 4/2014 | Murphy .................. H04L 43/10 370/255 |

(Continued)

FOREIGN PATENT DOCUMENTS

WO    2013184846 A1    12/2013

OTHER PUBLICATIONS

AI-Assisted Framework for Green-Routing and Load Balancing in Hybrid Software-Defined Networking: Proposal, Challenges and Future Perspective, by Richard Etengu et al., dated: Sep. 22, 2020 (Year: 2020).*

(Continued)

*Primary Examiner* — Atique Ahmed
(74) *Attorney, Agent, or Firm* — Shumaker & Sieffert, P.A.

(57) ABSTRACT

Techniques are described for predicting future behavior of links in a network and generating dynamic thresholds for link metrics for use in path selection. In one example, a computing system receives historical values of a link metric for links of a network. The computing system executes a machine learning system which processes the historical values of the link metric to generate: (1) a predicted future value of the link metric for each link; and (2) a threshold for the link metric indicating whether the predicted future value for each link is anomalous. The computing system computes a path based on the predicted future values of the link metric and the threshold for the link metric. The computing system provisions the computed path, thereby enabling a network device to forward network traffic along the computed path.

19 Claims, 5 Drawing Sheets

(56) References Cited

U.S. PATENT DOCUMENTS

| | | | |
|---|---|---|---|
| 9,104,543 B1 | 8/2015 | Cavanagh et al. | |
| 9,432,298 B1* | 8/2016 | Smith | H04L 49/9057 |
| 9,450,817 B1* | 9/2016 | Bahadur | H04L 41/0806 |
| 9,794,165 B1* | 10/2017 | Wood | H04L 45/125 |
| 10,432,342 B1* | 10/2019 | Bathula | H04J 14/0271 |
| 2004/0042402 A1* | 3/2004 | Galand | H04L 45/28 370/242 |
| 2006/0291446 A1* | 12/2006 | Caldwell | H04L 45/42 370/395.5 |
| 2012/0140637 A1* | 6/2012 | Dudkowski | H04L 45/302 370/238 |
| 2013/0010610 A1 | 1/2013 | Karthikeyan et al. | |
| 2015/0135012 A1 | 5/2015 | Bhalla et al. | |
| 2015/0195192 A1 | 7/2015 | Vasseur et al. | |
| 2017/0171812 A1* | 6/2017 | Guo | H04W 52/0212 |
| 2020/0067812 A1* | 2/2020 | Malhotra | H04L 45/66 |
| 2021/0019211 A1* | 1/2021 | Sghiouer | G06F 11/079 |
| 2021/0026725 A1* | 1/2021 | Roy | G06F 11/3006 |
| 2021/0142229 A1* | 5/2021 | Young | G06Q 30/0283 |
| 2022/0182310 A1* | 6/2022 | Byrne | H04L 41/0677 |
| 2023/0164045 A1* | 5/2023 | Vasseur | H04L 41/5019 709/224 |

OTHER PUBLICATIONS

AI-Assisted Framework for Green-Routing and Load Balancing in Hybrid Software-Defined Networking: Proposal, Challenges and Future Perspective Richard Etengu1, Saw Chin Tan1, Ching Kwang Lee2, Fouad Mohammed Abbou3 and Teong Che Chuah2 (Year: 2020).*

Bouzidi et al., "Deep Q-Network and Traffic Prediction based Routing Optimization in Software Defined Networks", Journal of Network and Computer Applications, vol. 192, Academic Press, New York NY USA, Aug. 13, 2021, 13 pp.

Etengu et al., "AI-Assisted Framework for Green-Routing and Load Balancing in Hybrid Software-Defined Networking: Proposal, Challenges and Future Perspective", IEEE Access, vol. 8, IEEE, US, Sep. 14, 2020, 58 pp.

Extended Search Report from counterpart European Application No. 22193909.3 dated May 12, 2023, 13 pp.

Ginsberg et al., "BGP—Link State (BGP-LS) Advertisement of IGP Traffic Engineering Performance Metric Extensions" RFC 8571, Internet Engineering Task Force (IETF), Mar. 2019, 10 pp.

Response to Extended Search Report dated May 12, 2023, from counterpart European Application No. 22193909.3 filed Jun. 26, 2024, 18 pp.

* cited by examiner

LINK BEHAVIOR PREDICTION FOR USE IN PATH SELECTION

TECHNICAL FIELD

The invention relates to computer networks and, more specifically, to selecting a path for network traffic within a computer network.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

SUMMARY

In general, techniques are described for a method, device, and computing system which predicts future values of a link metric of each link in a network and generates dynamic thresholds for the link metric for use in path selection. In one example, a computing system receives historical values of a link metric for each link of a plurality of links of a network. For example, the computing system stores values of the link metric for each link for each of multiple different time intervals in a time-series database so as to create a historical record of the link metric of each link over a historical time period.

The computing system executes a machine learning system which processes the values of the link metric for each link of the plurality of links. In some examples, the machine learning system is a deep learning system. Based on the values of the link metric for each link, the machine learning system generates a predicted future value of the link metric for each link. Furthermore, the machine learning system generates a threshold for the link metric. The threshold is indicative of whether a value of the link metric for each link at a given time is anomalous. In some examples, the threshold is indicative of whether a predicted future value of the link metric for a link is anomalous with respect to historical values of the link metric. In some examples, threshold is indicative of whether a predicted future value of the link metric for a link is anomalous with respect to predicted future values of the link metric for other links at the given time.

The computing system determines, based on the predicted future value of the link metric for each of links and the threshold, whether the predicted future value of the link metric for each link is anomalous. Further, the computing system computes a path comprising at least some of the plurality of links based on the determination. For example, the computing system may exclude a link, having a predicted future value of the link metric that exceeds the threshold (and therefore is determined to be anomalous), from a group of candidate links useable to form the path. As another example, the computing system may, based on the predicted future value of the link metric for each link and the threshold for the link metric, apply, increase, or decrease a weight applied to a link, wherein the weight may thereafter be used to determine whether to include the link in forming the path. The computing system provisions the computed path to enable a network device to forward network traffic along the computed path. Subsequently, the network device may forward the network traffic along the path.

The techniques may provide one or more technical advantages that realizes a practical application. For example, the techniques disclosed herein may enable a computing system, such as a network orchestrator or controller, to predict future instability of links of a network before such instability occurs. Furthermore, the techniques disclosed herein may enable such a computing system to define dynamic thresholds for predicting whether the future behavior of a link is an outlier with respect to the future behavior of other links in the network. The computing system described herein may use such predictions about future behavior of the links of a network to preemptively define or adjust paths over which network traffic is forwarded prior to the anticipated instability actually occurring. Therefore, such a computing system as described herein may provide enhanced traffic engineering capabilities, may improve the stability and reliability of network paths over which network devices forward traffic, and enable network devices to preemptively reroute traffic around a link before prior to the link experiencing instability.

In an example, this disclosure describes a method comprising: receiving, by processing circuitry of a computing system, values of a link metric for each link of a plurality of links of a network over a historical time period; processing, by a machine learning system executed by the processing circuitry, the values of the link metric for each link of the plurality of links to generate: 1) a predicted future value of the link metric for each link of the plurality of links; and 2) a threshold for the link metric, the threshold indicative of whether a value of the link metric for each link of the plurality of links at a given time is anomalous; determining, by the processing circuitry and based on the predicted future value of the link metric for each link of the plurality of links and the threshold, whether the predicted future value of the link metric for each link is anomalous; computing, by the processing circuitry and based on the determination, a path comprising at least some of the plurality of links and excluding at least one link of the plurality of links determined to be anomalous; and provisioning, by the processing circuitry, the computed path to enable a network device to forward network traffic along the computed path.

In an example, this disclosure describes a computing system comprising: a storage device; and processing circuitry operably coupled to the storage device, the processing circuitry configured to: receive values of a link metric for each link of a plurality of links of a network over a historical time period; execute a machine learning system configured to process the values of the link metric for each link of the plurality of links to generate: 1) a predicted future value of the link metric for each link of the plurality of links; and 2) a threshold for the link metric, the threshold indicative of whether a value of the link metric for each link of the plurality of links at a given time is anomalous; determine, based on the predicted future value of the link metric for each link of the plurality of links and the threshold, whether the predicted future value of the link metric for each link is anomalous; compute, based on the determination, a path comprising at least some of the plurality of links and excluding at least one link of the plurality of links determined to be anomalous; and provision the computed path to enable a network device to forward network traffic along the computed path.

In an example, this disclosure describes a non-transitory, computer-readable medium comprising instructions that, when executed, configure processing circuitry of a computing system to: receive values of a link metric for each link of a plurality of links of a network over a historical time period; execute a machine learning system configured to process the values of the link metric for each link of the plurality of links to generate: 1) a predicted future value of the link metric for each link of the plurality of links; and 2) a threshold for the link metric, the threshold indicative of whether a value of the link metric for each link of the plurality of links at a given time is anomalous; determine, based on the predicted future value of the link metric for each link of the plurality of links and the threshold, whether the predicted future value of the link metric for each link is anomalous; compute, based on the determination, a path comprising at least some of the plurality of links and excluding at least one link of the plurality of links determined to be anomalous; and provision the computed path to enable a network device to forward network traffic along the computed path.

The details of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Link stability plays a key role for uninterrupted traffic flow in a network. Techniques are disclosed herein for a software-defined networking (SDN) controller and method that may dynamically predict future instability in links of a network based on historic link status data. For example, the SDN controller may predict future metrics of a link using historical metrics of the link collected by the SDN controller over a previous time interval, such as a latency of the link, a number of times the link transitioned from an active state to an inactive state (e.g., "flipping" from "up" to "down"), or average downtime of the link. Such an SDN controller as described herein may enable the network to perform corrective action before a link failure occurs. Additionally, such an SDN controller may update link metrics automatically and reroute label switched paths (LSPs) prior to the occurrence of a link failure.

Figure 1:
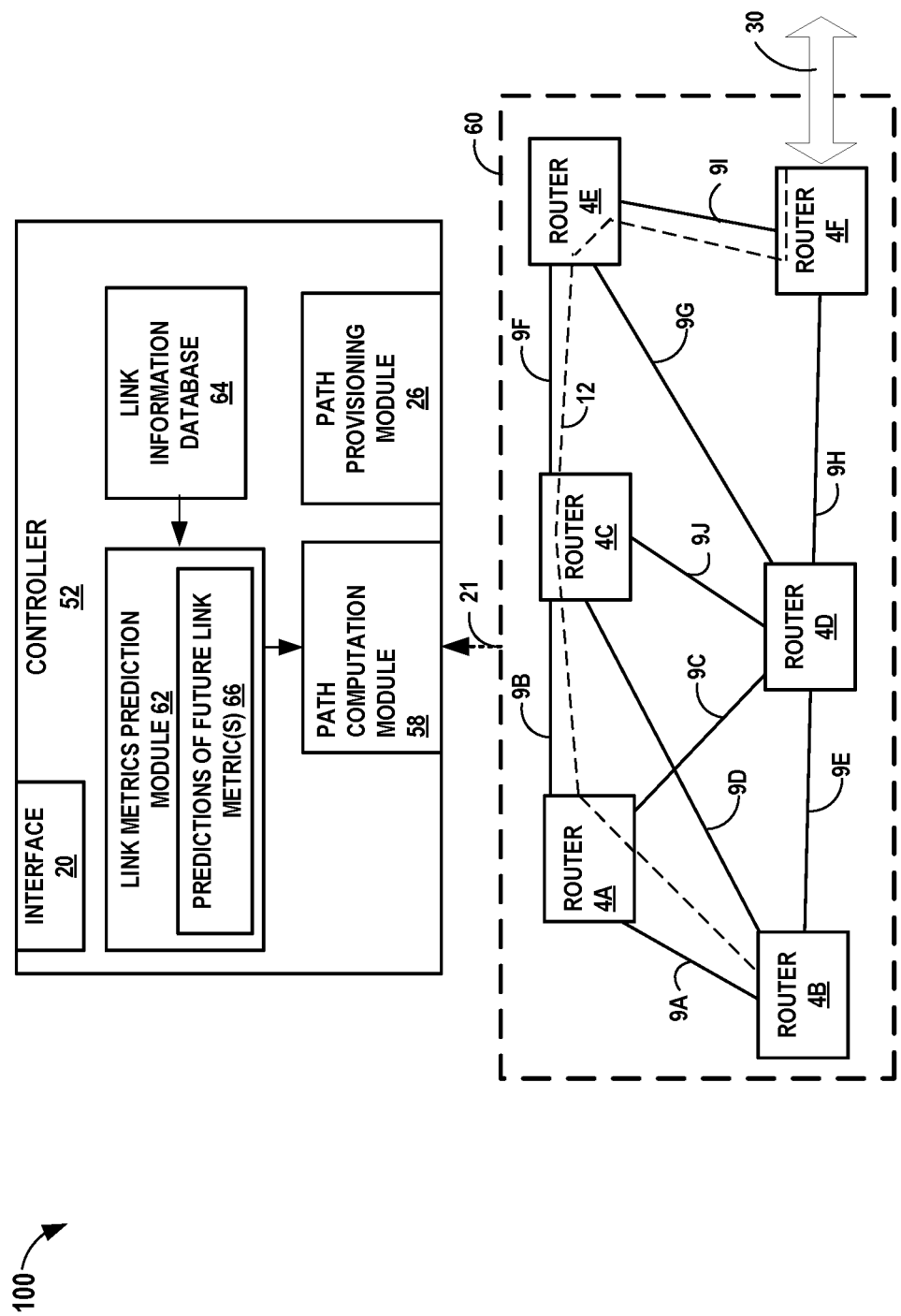
FIG. 1 is a block diagram illustrating an example system having a network and controller configured to provide path selection for a computer network, in accordance with techniques described in this disclosure.

FIG. 1 is a block diagram illustrating an example system 100 having a network 60 and controller 52 configured to provide path selection for a computer network, in accordance with techniques described in this disclosure. In the example of FIG. 1, network 60 includes routers 4A-4F (collectively "routers 4"), which control switching and routing of packet flows. Network 60 may represent an Internet Protocol (IP) network, for example. Examples of routers 4 include layer 3 (L3) routers and layer 2 (L2) switches or L2/L3 switches that collectively provide network 60. That is, network 60 typically provides L2/L3 traffic forwarding services, such as traffic engineering via Multiprotocol Label Switching traffic-engineered (MPLS-TE) including LSPs, Virtual Local Area Network (VLANs), and so forth. Various examples of network 60 may encompass many hundreds or even thousands of routers/switches. While the example of FIG. 1 is described as including routers 4, in other examples the techniques of the disclosure may be implemented using other types of network devices within network 60, including routers, switches, gateways, etc.

Network 60 is in effect an overlay network "built on top of" an underlying transport network (not depicted in FIG. 1). Routers 4 are connected by virtual or logical links (an example topology for which is illustrated in FIG. 1 with logical links 9A-9J (collectively "logical links 9")). Each path may include one or more physical links of the transport network. Routers 4 forward network packets of packet flows from sources to destinations along such paths.

Sources of network packets received and forwarded by routers 4 may include one or more devices (not shown) and/or any public or private network or the Internet. The destinations of the network packets being forwarded by routers 4 may include one or more destination devices and/or network that may include LANs or wide area networks (WANs) that include a plurality of devices. For example, destination devices may include personal computers, laptops, workstations, personal digital assistants (PDAs), wireless devices, network-ready appliances, file servers, print servers or other devices that receive network packets from sources.

Based on routes determined using, e.g., shortest path routing, each of routers 4 may configure its forwarding state to implement one or more paths over which to forward network traffic using, e.g., Multiprotocol Label Switching (MPLS) or an IPv6 architecture. Using MPLS, for instance, each of routers 4 may perform path selection using topology information learned by way of IGP to compute a shortest path within network 60 on a hop-by-hop basis based on the routing information maintained by the routers 4. Each of routers 4 may then select a next hop along the locally computed shortest path and install forwarding information associated with the selected next hop in a forwarding plane of the network node, wherein the forwarding information identifies a network interface to be used when forwarding traffic and one or more labels to be applied when forwarding the traffic out the interface. The routers 4 use the next hops with the assigned labels to forward traffic hop-by-hop.

Controller 52 allocates and signals path 12 over which routers 4 may forward network traffic. In some examples, controller 52 may determine path 12 in accordance with a network policy. In some examples, controller 52 applies path computation to compute a candidate path for satisfying the network policy. In addition, controller 52 programs network 60, in particular routers 4, with forwarding information for implementing the candidate paths. Controller 52 may program routers 4 using Network Configuration Protocol (NETCONF), Path Computation Element Communication Protocol (PCEP), BGP, or other protocols. Controller 52 may represent one or more segment routing (SR) controllers and may be a WAN controller that is manages not just the SR domain but path computation, traffic engineering, provisioning, and other network control tasks for an operator of network 60. Controller 52 may listen for other topology information using routing protocols.

In this example, controller 52 is a computing device that may compute one or more paths 12 that satisfy a network policy. Each of the paths 12 is from a source to a destination. Controller 52 may compute the path 12 from one or more sources to one or more destinations in order to realize the network policy. For example, controller 52 may compute a path 12 that meets one or more network policies (also referred to herein as "routing policies") that each specifies one or more performance requirements, service requirements, etc. In some examples, controller 52 may compute a plurality of paths 12, each of the paths corresponding to different, respective network policies.

Having computed the one or more paths 12, controller 52 may then program network 60 to forward network traffic on a given path 12. For example, router 4B may steer a network packet to a next router 4A along path 12. Router 4A may steer the network packet to a next router 4C along path 12, and so on. In some examples, routers 4 can use weighted or non-weighted equal-cost multipath (ECMP) to forward traffic to a next router along path 12 and/or to select a particular computed path 12.

Controller 52 may represent a high-level controller for configuring and managing network 60. Controller 52 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 52 may be distributed among one or more real or virtual computing devices. Any such devices listed above may be in-network or out-of-network with regard to network 60. Example details of an SDN controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/500,736, filed Sep. 29, 2014, and entitled "BATCHED PATH COMPUTATION IN RESOURCE-CONSTRAINED NETWORKS," which are both incorporated by reference herein in their entireties.

Controller 52 may obtain traffic engineering data 21 for network 60 by executing one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 52 may store traffic engineering information to a traffic engineering database (TED).

Controller 52 in this example presents northbound interface 20 that may be invoked by other controllers in a hierarchical arrangement of controllers or by an orchestrator, administrator, application, or other entity, to present traffic demands 32 for network 60. Interface 20 may be usable for integration with an orchestration system such as OpenStack; interface 20 may also or alternatively be usable by other applications or the operator's Operations Support Systems (OSS)/Business Support Systems (BSS). Interface 20 may in some cases present a RESTful Application Programming Interface (API). Interface 20 may further present GUIs/CLIs by which the network operator may access network management tools including, e.g., path computation module 58, to obtain information regarding the operations of network 60 and to program network 60.

Controller 52 includes path computation module 58 and, in some instances, a path provisioning module 26 to compute and provision paths, respectively, between path computation clients (e.g., routers) in a network. As further described below, path computation module 58 may intelligently compute and establish requested paths through the path computation domain (e.g., network 60). Upon computing paths, path computation module 58 schedules the paths for provisioning by path provisioning module 26.

For example, controller 52 determines a topology of network links 9 for network 60 by which routers 4 may switch network traffic flows 30 in order to meet a network policy corresponding to the traffic flows 30. Controller 52 may determine the logical network topology for network 60 to facilitate an optimized total resource cost to the network 60 for transporting the traffic. Controller 52 obtains a set of candidate links available for use as network links in network 60.

Path computation module 58 decides the routers 4 on which to steer packets mapped to network policies. Path computation module 58 applies path computation to compute candidate paths for satisfying a network policy, based on traffic engineering data 21 and/or link data from link information database 64. The computed paths may be placed to the model of network 60 such that links 9 may be mapped to the paths. Path computation module 58 then schedules the computed and placed paths for provisioning by path provisioning module 26, which in turn provisions the computed paths in the network.

In accordance with the techniques described in this disclosure, controller 52 includes link information database 64 and link metrics prediction module 62 to predict future values 66 of a link metric of each link 9 in network 60 and generate dynamic thresholds for the link metric for use in path selection by path computation module 58. As described below, controller 52 may perform corrective action to reroute traffic around a link 9 based on a determination that link 9 is likely to experience failure in the future, before such failure actually occurs. In some examples, controller 52 may update link metrics automatically and reroute LSPs prior to the occurrence of a failure of one of links 9.

In one example, controller 52 receives historical values of a link metric for each link 9 of network 60. Controller 52 obtains each value of the link metric during a different time interval than each other value of the values of the link metric. For example, controller 52 may obtain, for link 9A, a value of the link metric every minute for a previous 24-hour time period. In some examples, the metric is a latency of a link 9, a number of transitions of the link 9 from an "active" state to an "inactive" state over a previous time interval, or an average downtime of the link 9 over the previous time interval. In some examples, the metric includes each of the latency of the link 9, the number of transitions of the link 9 from an "active" state to an "inactive" state over a previous time interval, and the average downtime of the link 9 over the previous time interval. In some examples, controller 52 receives the values of the link metric for each link 9 from routers 4 via Border Gateway Protocol (BGP) Link State (BGP-LS) advertisements.

Controller 52 stores values of the link metric for each link 9 for each of multiple different time intervals in link information database 64 so as to create a historical record of the link metric of each link. In some examples, link information database 64 is a multivariate time-series database. For example, link information database 64 stores, for each link 9, a plurality of entries, each entry including a value of the link metric for the link 9 and a different time interval during which the value of the link metric for the link was obtained.

Link metrics prediction module 62 executes a machine learning system to predict link stability of one or more links 9 of FIG. 1. In some examples, the machine learning system is a deep learning system. The machine learning system processes values of the link metric for each link 9 to generate a predicted future value 66 of the link metric for each link of the plurality of links. For example, link metrics prediction module 62 may predict a latency, a number of transitions of the link 9 from an "active" state to an "inactive" state, or an average downtime of the link at a future time.

Further, the machine learning system processes values of the link metric for each link 9 to generate a threshold for the link metric. The threshold is indicative of whether a value of the link metric for each link 9 at a given time is anomalous. In some examples, the threshold is indicative of whether a predicted future value of the link metric for a link 9 is anomalous with respect to historical values of the link metric for the same link 9. In some examples, threshold is indicative of whether a predicted future value of the link metric for a link 9 is anomalous with respect to predicted future values of the link metric for other links 9 at the given time. As described above, link metrics prediction module 62 may predict, e.g., a future latency for each link 9. Furthermore, the generated threshold may indicate whether the predicted future latency of, e.g., link 9A is anomalous with respect to the predicted future latencies of other links 9, In some examples, the machine learning system comprises a deep learning system configured to apply a plurality of hidden artificial neural network layers to the values of the link metric for each link 9 to generate the predicted future value 66 of the link metric for each link 9 and the threshold for the link metric. Hidden artificial neural network layers are processing layers in a neural network, other than an input layer and an output layer. In some examples, the deep learning system comprises a Long Short-Term Memory (LSTM) deep learning system. An example of a deep learning algorithm for generating the predicted future value 66 of the link metric for each link 9 and the threshold for the link metric described below with respect to FIG. 5.

Path computation module 114 determines, based on the predicted future value of the link metric for each of links 9 and the threshold, whether the predicted future value of the link metric for each link 9 is anomalous. Further, path computation module 58 computes, based on the determination, path 12 comprising at least some links 9 and excluding at least one link 9 determined to be anomalous. As depicted in the example of FIG. 1, path 12 is a path between router 4B and router 4F, and includes links 9A, 9B, 9F, and 9I.

For example, path computation module 58 may exclude a link 9, having a predicted future value of the link metric that exceeds the threshold (and therefore may be determined to be anomalous), from a group of candidate links useable to form path 12. For example, path computation module 58 may exclude link 9D from a group of candidate links useable to form path 12 based on link 9D having, e.g., a predicted future latency that exceeds the threshold for latency.

As another example, path computation module 58 may, based on the predicted future value of the link metric for each link 9 and the threshold for the link metric, apply, increase, or decrease a weight applied to the link 9, wherein the weight may thereafter be used to determine whether to include the link 9 in forming path 12. As another example, path computation module 58 may assign a comparatively lower weight to link 9A and a comparatively higher weight to link 9E based on link 9A having, e.g., a predicted future latency that is lower than a predicted future latency of link 9E. Alternatively, or in addition, path computation module 58 may assign a comparatively lower weight to link 9A and a comparatively higher weight to link 9E based on link 9A having, e.g., a predicted future latency that is lower than the threshold for latency and link 9E having a predicted future latency that is higher than the threshold for latency (and therefore may be determined to be anomalous). In some examples, path computation module 58 may ordering a group of candidate links 9 based on the applied weights, and may select, for including in path 12, one or more links having the lowest applied weight (or, in an equivalent implementation, the most applied weight).

Path provisioning module 26 provisions the computed path to enable a network device, such as one of routers 4, to forward network traffic along the computed path. In some examples, path provisioning module 26 provides the computed path to the network device to enable the network device to forward network traffic along the computed path. Subsequently, the network device may forward the network traffic along the path.

Figure 2:
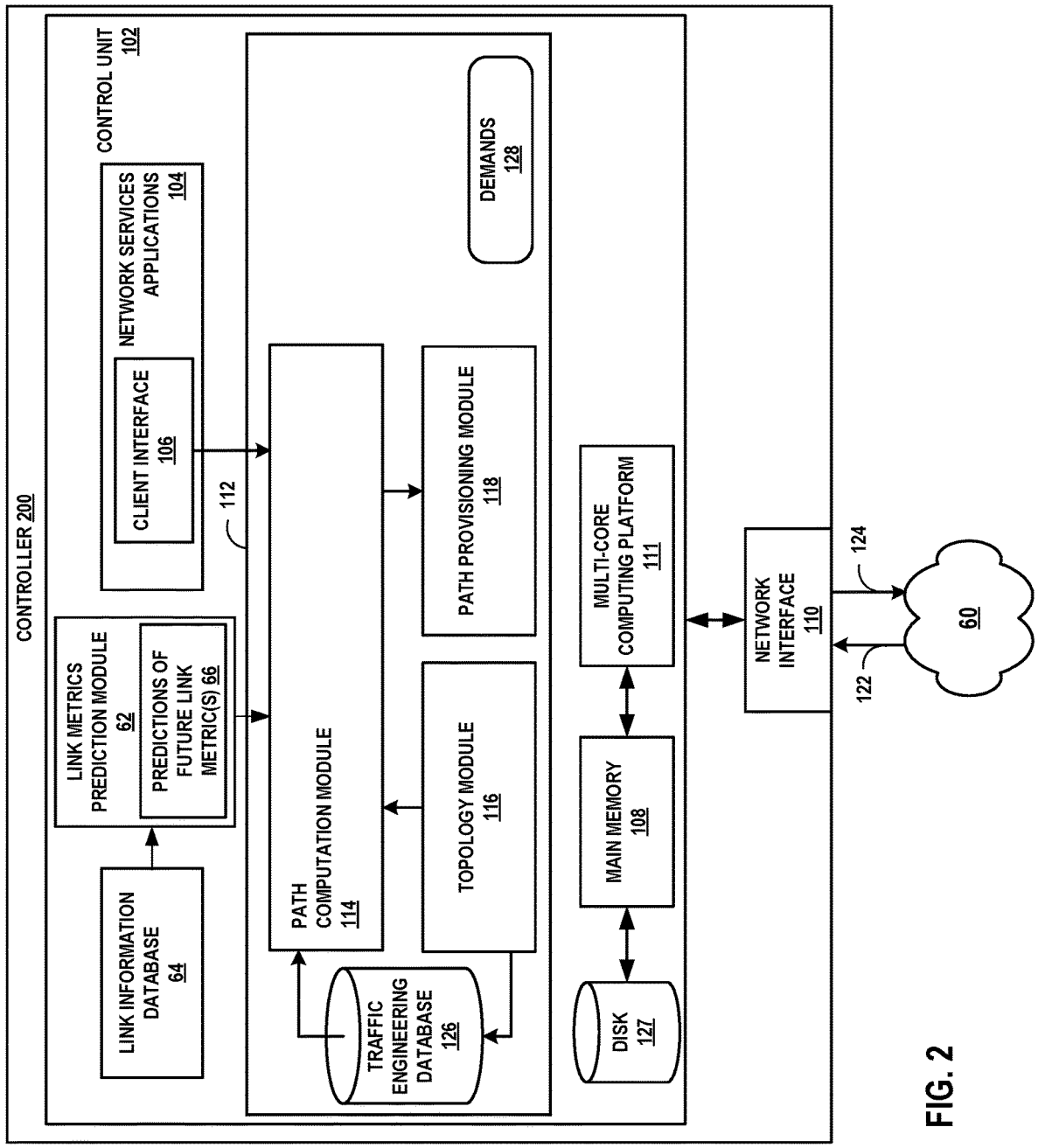
FIG. 2 is a block diagram illustrating an example controller, according to techniques of this disclosure.

FIG. 2 is a block diagram illustrating an example controller configured to provide path selection for a computer network, in accordance with techniques of this disclosure. In response to receiving demands, the controller 200 computes and outputs a logical network topology that meets the traffic demands for the network 60. Controller 200 may include a server or network controller, for example, and may represent an example instance of controller 52 of FIG. 1. In some instances, controller 200 may represent an example network management system that may not be capable of provisioning the paths, but is used by a network operator for network planning and analysis purposes. In such instances, controller 200 may not include path provisioning module 118 and may include an interface similar to interface 20 for outputting a representation of selected links for a solution.

Controller 200 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data.

Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and topology element 112. In some examples, these modules may be implemented as one or more processes executing on one or more virtual machines or containers of one or more servers. That is, while generally illustrated and described as executing on a single controller 200, aspects of modules 104, 112 may be executed on other computing devices or on different virtual machines or containers of one or more computing devices.

Network services applications 104 represent one or more processes that provide services to clients of a service provider network that includes network 60 and controller 200 to manage connectivity in the path computation domain. Network services applications 104 may provide, for instance, movie, television, or other media content distribution, Voice-over-IP (VoIP), Video-on-Demand (VOD), bulk transport, walled/open garden, IP Mobility Subsystem (IMS) and other mobility services, and Internet services to clients of a service provider network controlled at least in part by controller 200. Networks services applications 104 may issue demands to topology element 112 to request transport services of network 60. One or more of network services applications 104 may include or otherwise make use of a client interface 106 by which one or more client applications request transport services. Client interface 106 may represent a command line interface (CLI) or graphical user interface (GUI), for instance. Client interface 106 may also, or alternatively, provide an application programming interface (API) such as a web service to client applications.

Network services applications 104 may issue demands to topology element 112 to request respective paths in a path computation domain controlled by controller 200 from sources to destinations. For example, a demand may include a required bandwidth or other constraint and two endpoints representing a source and a destination that communicate over the path computation domain managed by controller 200. Control unit 102 stores demands as a list of demands in the demands 128 data structure ("demands 128"). In some cases, the service provider or other administrator of network 60 may configure, via an administrative interface, one or more demands 128. In some cases, topology element 112 may additionally or alternatively derive projected demands 128 based on patterns of demands previously experienced by network 60.

Topology element 112 accepts demands to route traffic between the endpoints for the demands over the path computation domain. Demands may be requested for different times and dates and with disparate bandwidth requirements. Topology element 112 may reconcile demands from network services applications 104 to multiplex requested paths for the corresponding traffic onto the network 60 path computation domain based on demand parameters and network resource availability.

To intelligently compute a topology for network 60, topology element 112 may in some cases include topology module 116 to receive traffic engineering information, such as traffic engineering data 21 of FIG. 1, describing available resources of network 60, including routers 4 and interfaces thereof and interconnecting network links 9. Topology module 116 may execute one or more southbound protocols, such as Open Shortest Path First with Traffic Engineering extensions (OSPF-TE), Intermediate System to Intermediate System with Traffic Engineering extensions (ISIS-TE), BGP Link State (BGP-LS), to learn traffic engineering information for network 60.

Traffic engineering database (TED) 126 stores traffic engineering information, received by topology module 116, for network 60 that constitutes a path computation domain for controller 200. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with the techniques described in this disclosure, controller 200 includes link information database 64 and link metrics prediction module 62 to predict future values 66 of a link metric of each link 9 in network 60 and generate dynamic thresholds for the link metric for use in path selection by path computation module 58. In one example, controller 200 receives historical values of a link metric for each link 9 of network 60 of FIG. 1. In some examples, controller 200 receives the values of the link metric for each link 9 from routers 4 of FIG. 1 via BGP-LS advertisements. In some examples, controller 200 monitors link status of links 9 via a topology service.

Controller 200 stores values of the link metric for each link 9 for each of multiple different time intervals in link information database 64 so as to create a historical record of the link metric of each link. In some examples, link information database 64 is a multivariate time-series database. In some examples, controller 200 consumes link status information from the topology service via Advanced Message Queuing Protocol (AMQP).

Link metrics prediction module 62 executes a machine learning system which processes the values of the link metric for each link 9 to predict link stability of one or more links 9 of FIG. 1. In some examples, the machine learning system is a deep learning system. In some examples, the deep learning system may apply LSTM deep learning techniques to forecast a configurable future downtime or flip count of links 9. In some examples, the deep learning system receives a link name, a link delay, and a count of link transitions over a historical time period, and an amount of link downtime over the historical time period as three input parameters from link information database 64. The deep learning system generates, based on these input parameters, a predicted future value of link delay, a predicted future count of link transitions, and a predicted future amount of downtime for each link 9. For example, the deep learning system can be configured to apply multiple hidden artificial neural network layers to the values of each link metric for each link 9 to generate the predicted future value of the link metric. The machine learning system of link metrics prediction module 62 may apply a multivariate or multistep timeseries-based LSTM forecasting to predict a future downtime or number of transitions of each link over a future time period. In some examples, an administrator may configure the future time period over which the machine learning system may generate the predictions. Based on the values of the link metric for each link 9, the machine learning system of link metrics prediction module 62 generates a predicted future value of the link metric for each link 9.

Furthermore, the machine learning system generates a threshold for the link metric. The threshold is indicative of whether a value of the link metric for each link 9 at a given time is anomalous. In some examples, the threshold is indicative of whether a predicted future value of the link metric for a link 9 is anomalous with respect to historical values of the link metric for the same link 9. In some examples, threshold is indicative of whether a predicted future value of the link metric for a link 9 is anomalous with respect to predicted future values of the link metric for other links 9 at the given time.

In some examples, link metrics prediction module 62 may perform dynamic thresholding with the values of the link metric for each link 9 to dynamically generate a threshold for the predicted future values of the link metric for each link 9. In some examples, link metrics prediction module 62 may apply an anomaly detection algorithm to the values of the link metric for each link 9 to generate a threshold for the predicted future values of the link metric for each link 9. In some examples, the anomaly detection algorithm is an Isolation Forest algorithm with which link metrics prediction module 62 may generate candidate anomaly values and apply critical rules to eliminate false positives. In some examples, the threshold is a threshold for a downtime of links 9 (e.g., such as a number of seconds of downtime per hour). In some examples, the threshold is a threshold for a number of times a link transitions from an active state to an inactive state (e.g., such as a count of such transitions per hour). In some examples, link metrics prediction module 62 may periodically predict link stability at predetermined time intervals (e.g., 1 minute, 5 minutes, 15 minutes, etc.). In some examples, the time interval may be configurable by an administrator.

In some examples, the link metric is latency. Controller 52 receives values of latency for each link 9. Link metrics prediction module 62 generates a predicted future value of latency for each link 9. Further, link metrics prediction module 62 generates a threshold for latency, the threshold indicative of whether the predicted future value of latency for each link 9 is anomalous. In some examples, the threshold is indicative of whether a predicted future latency for a link 9 is anomalous with respect to historical latency for the same link 9. In some examples, threshold is indicative of whether a predicted future latency for a link 9 is anomalous with respect to predicted future latency for other links 9 at the given time.

In some examples, the link metric is an amount of downtime for each link 9. Controller 52 receives values of the amount of downtime of each link 9. Link metrics prediction module 62 generates a predicted future amount of downtime for each link 9. Further, link metrics prediction module 62 generates a threshold for an amount of downtime, the threshold indicative of whether the predicted future amount of downtime for each link 9 is anomalous. In some examples, the threshold is indicative of whether a predicted future downtime for a link 9 is anomalous with respect to historical downtime for the same link 9. In some examples, threshold is indicative of whether a predicted future downtime for a link 9 is anomalous with respect to predicted future downtime for other links 9 at the given time.

In some examples, the link metric is a number of transitions of the link from an active state to an inactive state for each link 9. Controller 52 receives values of the number of transitions of each link 9. Link metrics prediction module 62 generates a predicted future number of transitions from an active state to an inactive state for each link 9. Further, link metrics prediction module 62 generates a threshold for a number of transitions from an active state to an inactive state, the threshold indicative of whether the predicted future number of transitions from an active state to an inactive state for each link 9 is anomalous. In some examples, the threshold is indicative of whether a predicted number of transitions for a link 9 is anomalous with respect to a historical number of transitions for the same link 9. In some examples, threshold is indicative of whether a predicted future number of transitions for a link 9 is anomalous with respect to predicted a future number of transitions for other links 9 at the given time. Link metrics prediction module 62 provides the predicted future value of the link metric for each link 9 and the threshold for the link metric to path computation module 114. In some examples, link metrics prediction module 62 transmits the predicted future value of the link metric for each link 9 and the threshold for the link metric to path computation module 114 via AMQP.

Path computation module 114 of topology element 112 may compute paths that satisfy demands 128 for the network (e.g., network 60 of FIG. 1). Path computation module 114 may represent an example instance of path computation module 58 of FIG. 1. Path computation module 114 obtains link data from link information database 64 describing candidate links for network 60, as well as information relevant to path optimization such as predictions of future link metrics, as described above. In some examples, path computation module 114 stores the received data in TED 126. Controller 200 may determine candidate links for routing in the network 60 that have feasible paths. Path computation module 114 may compute and place the paths mapped to the candidate links to a model of the network.

Path computation module 114 having selected and routed the candidate links for network 60, path provisioning module 118 attempts to set the routed paths for the candidate links onto network 60. Path provisioning module 118 of controller 200 may program the paths into network 60 to cause the state of network 60 to match the state of network 60 as determined by path computation module 114. Path provisioning module 118 may represent an example of path provisioning module 26 of FIG. 1. Provisioning a path may require path validation prior to committing the path to provide for packet transport. Path provisioning module 118 executes one or more southbound protocols for path provisioning to inject state into elements of network 60, such as any one or more of routers 4. A southbound protocol refers to a protocol by which components of controller 200 may communicate with network 60 elements, such as routers 4, to obtain or inject topology information, forwarding, and other network information that determines the operation of the network 60. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN configuration protocol).

Path computation module 114 uses the predicted future value of the link metric for each link 9 and the threshold for the link metric to compute path 12. For example, path computation module 114 determines, based on the predicted future value of the link metric for each of links 9 and the threshold, whether the predicted future value of the link metric for each link 9 is anomalous. In some examples, the threshold is indicative of whether a predicted future value of the link metric for a link 9 is anomalous with respect to historical values of the link metric for the same link 9. In some examples, threshold is indicative of whether a predicted future value of the link metric for a link 9 is anomalous with respect to predicted future values of the link metric for other links 9 at the given time. Further, path computation module 114 computes, based on the determination, path 12. Path 12 includes at least some of links 9 and excludes at least one link 9 determined to be anomalous.

For example, path computation module 114 may identify which links have predicted future value of the link metric that breach the generated threshold for each link metric and exclude such links from inclusion in the path computation or penalize such links in the path computation. In some examples, path computation module 114 determines, based on a first predicted future value of the link metric for a first link 9 and the threshold for the link metric indicative that the first predicted future value of the link metric for the first link is not anomalous, to include the first link 9 in a group of candidate links. Further, path computation module 114 determines, based on a second predicted future value of the link metric for a second link 9 and the threshold for the link metric indicative that the second predicted future value of the link metric for the second link is anomalous, to exclude the second link from the group of candidate links. Path computation module 114 forms path 12 from one or more links of the group of candidate links.

In some examples, path computation module 114 applies, based on a first predicted future value of the link metric for a first link 9 and the threshold for the link metric, a first weight to the first link 9. Further path computation module 114 applies, based on a second predicted future value of the link metric for a second link 9 and the threshold for the link metric, a second weight to the second link 9. In some examples, path computation module 114 applies the first and second weights to the respective first and second links 9 in proportion to the predicted future value of the link metric for the respective first and second links 9. In some examples, path computation module 114 applies the first and second weights to the respective first and second links 9 in proportion to a quantity by which the predicted future value of the link metric for the respective first and second links 9 exceeds the generated threshold for the link metric. Path computation module 114 selects the first link and not the second link and forms, based on a comparison of the first weight to the second weight, a path 12 from the first link 9 and not the second link 9.

In some examples, path computation module 114 computes path 12 and path provisioning module 118 provisions path 12 in response to detecting a change in the network. The change in the network may include, e.g., an addition or removal of a link 9 or an addition or removal of a network device, such as one of routers 4. In some examples, path computation module 114 computes path 12 and path provisioning module 118 provisions path 12 on a predefined periodic basis, such as once per minute, day, week, etc.

In this manner, using the techniques disclosed herein, path computation module 114 may compute a path 12 that avoids links 9 that may not have instability at the present time, but are predicted to have instability in the future. Additionally, path computation module 114 may take corrective action to proactively recompute a path 12 so as to avoid a link that is predicted to have future instability, e.g., such as prior to such instability occurring. Therefore, controller 200, using the techniques disclosed herein, may use predictions of link instability to avoid service delay or unnecessary network operations such as secondary LSP activation.

Figure 3:
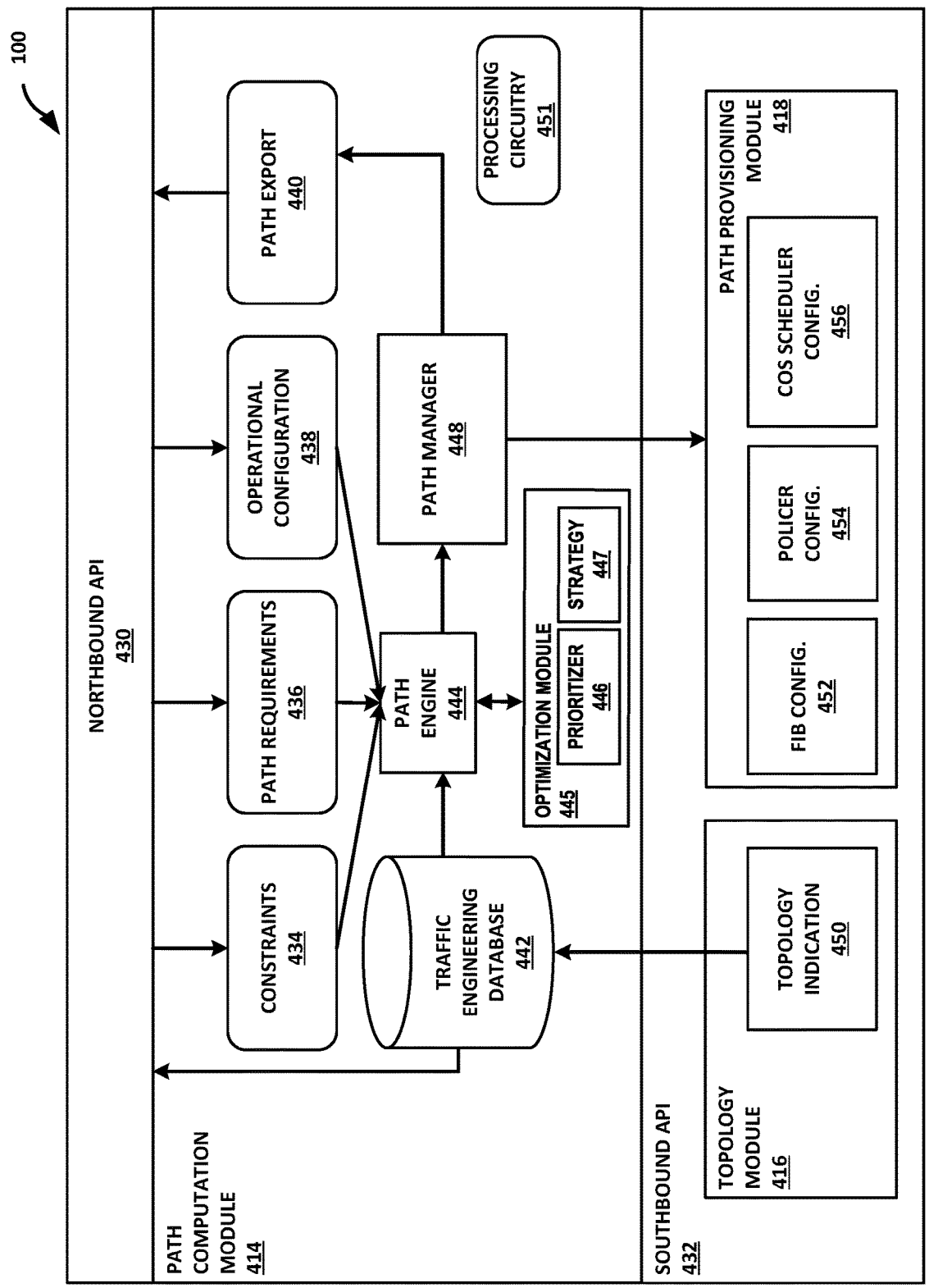
FIG. 3 is a block diagram illustrating an example controller in further detail, according to techniques of this disclosure.

FIG. 3 is a block diagram illustrating an example of a controller in further detail, in accordance with the techniques of this disclosure. Controller 200 may represent an example implementation of controller 200 of FIG. 2. Controller 200 may be or implement a WAN controller, software-defined networking (SDN) controller, and/or path computation element, for instance.

In general, path computation module 414 and path provisioning module 418 of controller 200 may use the protocols to instantiate paths between path computation clients (e.g., routers) in a network. Southbound API 432 allows controller 200 to communicate with network devices, e.g., routers and switches of the network using, for example, ISIS, OSPFv2, BGP-LS, and PCEP protocols. By providing a view of the global network state and bandwidth demand in the network, controller 200 is able to compute optimal paths and provision the network for forwarding network traffic through network 60.

In some examples, application services issue path requests to controller 200 to request paths in a path computation domain controlled by controller 200. For example, a path request includes a required bandwidth or other constraint and two endpoints representing an access node and an edge node that communicate over the path computation domain managed by controller 200. Path requests may further specify time/date during which paths must be operational and CoS parameters (for instance, bandwidth required per class for certain paths).

Controller 200 accepts path requests from application services to establish paths between the endpoints over the path computation domain. Paths may be requested for different times and dates and with disparate bandwidth requirements. Controller 200 may reconcile path requests from application services to multiplex requested paths onto the path computation domain based on requested path parameters and anticipated network resource availability.

To intelligently compute and establish paths through the path computation domain, controller 200 includes topology module 416 to maintain topology information (e.g., within traffic engineering database 442) describing available resources of the path computation domain, including access, aggregation, and edge nodes, interfaces thereof, and interconnecting communication links.

Path computation module 414 of controller 200 computes requested paths through the path computation domain. In general, paths are unidirectional. Upon computing paths, path computation module 414 schedules the paths for provisioning by path provisioning module 418. A computed path includes path information usable by path provisioning module 418 to establish the path in the network. Provisioning a path may require path validation prior to committing the path to provide for packet transport.

Further example details of a distributed WAN controller may be found in U.S. Pat. No. 9,450,817, entitled "Software Defined Network Controller," the entire contents of which is incorporated herein by reference. This is merely one example, and controller 200 may compute and provision paths in other ways.

In this example, controller 200 includes northbound and southbound interfaces in the form of northbound application programming interface (API) 430 and southbound API 432. Northbound API 430 includes methods and/or accessible data structures by which, as noted above, application services may configure and request path computation and query established paths within the path computation domain. Southbound API 432 includes methods and/or accessible data structures by which controller 200 receives topology information for the path computation domain and establishes paths by accessing and programming data planes of aggregation nodes and/or access nodes within the path computation domain.

Path computation module 414 includes data structures to store path information for computing and establishing requested paths. These data structures include constraints 434, path requirements 436, operational configuration 438, and path export 440. Application services may invoke northbound API 430 to install/query data from these data structures. Constraints 434 represent a data structure that describes external constraints upon path computation. Constraints 434 allow application services to, e.g., modify link attributes such as metrics before path computation module 414 computes a set of paths.

Application services may modify attributes of a link to effect resulting traffic engineering computations. In such instances, link attributes may override attributes received from topology indication module 450 and remain in effect for the duration of the node/attendant port in the topology. A link edit message to constraints 434 may include a link descriptor specifying a node identifier and port index, together with link attributes specifying a bandwidth, expected time to transmit, shared link group, and fate shared group, for instance. The link edit message may be sent by the controller 200.

Operational configuration 438 represents a data structure that provides configuration information to controller 200 to configure the path computation algorithm with respect to, for example, class of service (CoS) descriptors and detour behaviors. Operational configuration 438 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 440 represents an interface that stores path descriptors for all paths currently committed or established in the path computation domain. In response to queries received via northbound API 430, path export 440 returns one or more path descriptors. Queries received may request paths between any two edge and access nodes terminating the path(s). In some examples, path descriptors may be used by application services to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 436 represent an interface that receives path requests for paths to be computed by path computation module 414 and provides these path requests (including path requirements) to path engine 444 for computation. Path requirements 436 may be received, or may be handled by the controller. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 416 includes topology indication module 450 to handle topology discovery and, where needed, to maintain control channels between controller 200 and nodes of the path computation domain. Topology indication module 450 may include an interface to describe received topologies to path computation module 414.

Topology indication module 450 may use a topology discovery protocol to describe the path computation domain topology to path computation module 414. In one example, using a cloud control protocol mechanism for topology discovery, topology indication module 450 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 450 may communicate with a topology server, such as a routing protocol route reflector, to receive topology information for the network. Topology indication module 450 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 450 may in some instances be a passive listener that neither forwards nor originates routing protocol advertisements. In some instances, topology indication module 450 may alternatively, or additionally, execute a topology discovery mechanism such as an interface for an Application-Layer Traffic Optimization (ALTO) service. Topology indication module 450 may therefore receive a digest of topology information collected by a topology server, e.g., an ALTO server, rather than executing a routing protocol to receive routing protocol advertisements directly.

In some examples, topology indication module 450 receives topology information that includes traffic engineering (TE) information. Topology indication module 450 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology indication module 450 executes BGP-TE to receive advertised TE information for inter-autonomous system and other out-of-network links.

Traffic engineering database (TED) 442 stores topology information, received by topology indication module 450, for a network that constitutes a path computation domain for controller 200 to a computer-readable storage medium (not shown). TED 442 may include one or more link-state databases (LSDBs), where link and node data is received in routing protocol advertisements, received from a topology server, and/or discovered by link-layer entities such as an overlay controller and then provided to topology indication module 450. In some instances, an operator may configure traffic engineering or other topology information within TED 442 via a client interface. TED 442 may also store link data (e.g., link data obtained from link information database 64 of FIG. 1) describing candidate links for the path computation domain, as well as information relevant to path optimization such as the physical length or delay of the link in some cases.

Path engine 444 accepts the current topology snapshot of the path computation domain in the form of TED 442 and computes, using TED 442, traffic-engineered paths between nodes as indicated by configured node-specific policy (constraints 434), and/or through dynamic networking with external modules via APIs.

In general, to compute a requested path, path engine 444 determines based on TED 442 and all specified constraints whether there exists a path in the network that satisfies the TE specifications for the requested path for the duration of the requested time. Path engine 444 may use the Dijkstra constrained SPF (CSPF) path computation algorithms for identifying satisfactory paths though the path computation domain. If there are no TE constraints, path engine 444 may revert to SPF. If a satisfactory computed path for the requested path exists, path engine 444 provides a path descriptor for the computed path to path manager 448 to establish the path using path provisioning module 418. A path computed by path engine 444 may be referred to as a "computed" path, until such time as path provisioning module 418 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 448 establishes computed scheduled paths using path provisioning module 418, which in this instance includes forwarding information base (FIB) configuration module 452 (illustrated as "FIB CONFIG. 452"), policer configuration module 454 (illustrated as "POLICER CONFIG. 454"), and CoS scheduler configuration module 456 (illustrated as "COS SCHEDULER CONFIG. 456"). Paths that have been established within the path computation domain (e.g., network 60 of FIG. 1) may be referred to as a "placed" path.

FIB configuration module 452 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 452 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 452 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module 452 establishes communication sessions with aggregation nodes or access nodes to install forwarding information to receive path setup event information, such as confirmation that received forwarding information has been successfully installed or that received forwarding information cannot be installed (indicating FIB configuration failure).

FIB configuration module 452 may add, change (i.e., implicit add), or delete forwarding table entries in accordance with information received from path computation module 414. A FIB configuration message from path computation module 414 to FIB configuration module 452 may specify an event type (add or delete); a node identifier; a path identifier; one or more forwarding table entries each including an ingress port index, ingress label, egress port index, and egress label; and a detour path specifying a path identifier and CoS mode.

Policer configuration module 454 may be invoked by path computation module 414 to request a policer be installed on a particular aggregation node or access node for a particular LSP ingress. As noted above, the FIBs for aggregation nodes or access nodes include policers at LSP ingress. Policer configuration module 454 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 452 configures the policers in accordance with the policer configuration requests.

CoS scheduler configuration module 456 may be invoked by path computation module 414 to request configuration of CoS scheduler on the aggregation nodes or access nodes. CoS scheduler configuration module 456 may receive the CoS scheduler configuration information. A scheduling configuration request message may specify an event type (change); a node identifier; a port identity value (port index); and configuration information specifying bandwidth, queue depth, and scheduling discipline, for instance.

Path engine 444 may compute one or more paths 12 that satisfy one or more network policies Path provisioning module 418 may output the paths to routers 4 to provision the network to forward traffic along the paths 12.

Controller 200 includes a hardware environment including processing circuitry 451 for executing machine-readable software instructions for implementing modules, interfaces, managers, and other components illustrated and described with respect to controller 200. The components may be implemented solely in software, or hardware, or may be implemented as a combination of software, hardware, or firmware. For example, controller 200 may include one or more processors comprising processing circuitry 451 that execute program code in the form of software instructions. In that case, the various software components/modules of may comprise executable instructions stored on a computer-readable storage medium, such as computer memory or hard disk (not shown).

Figure 4:
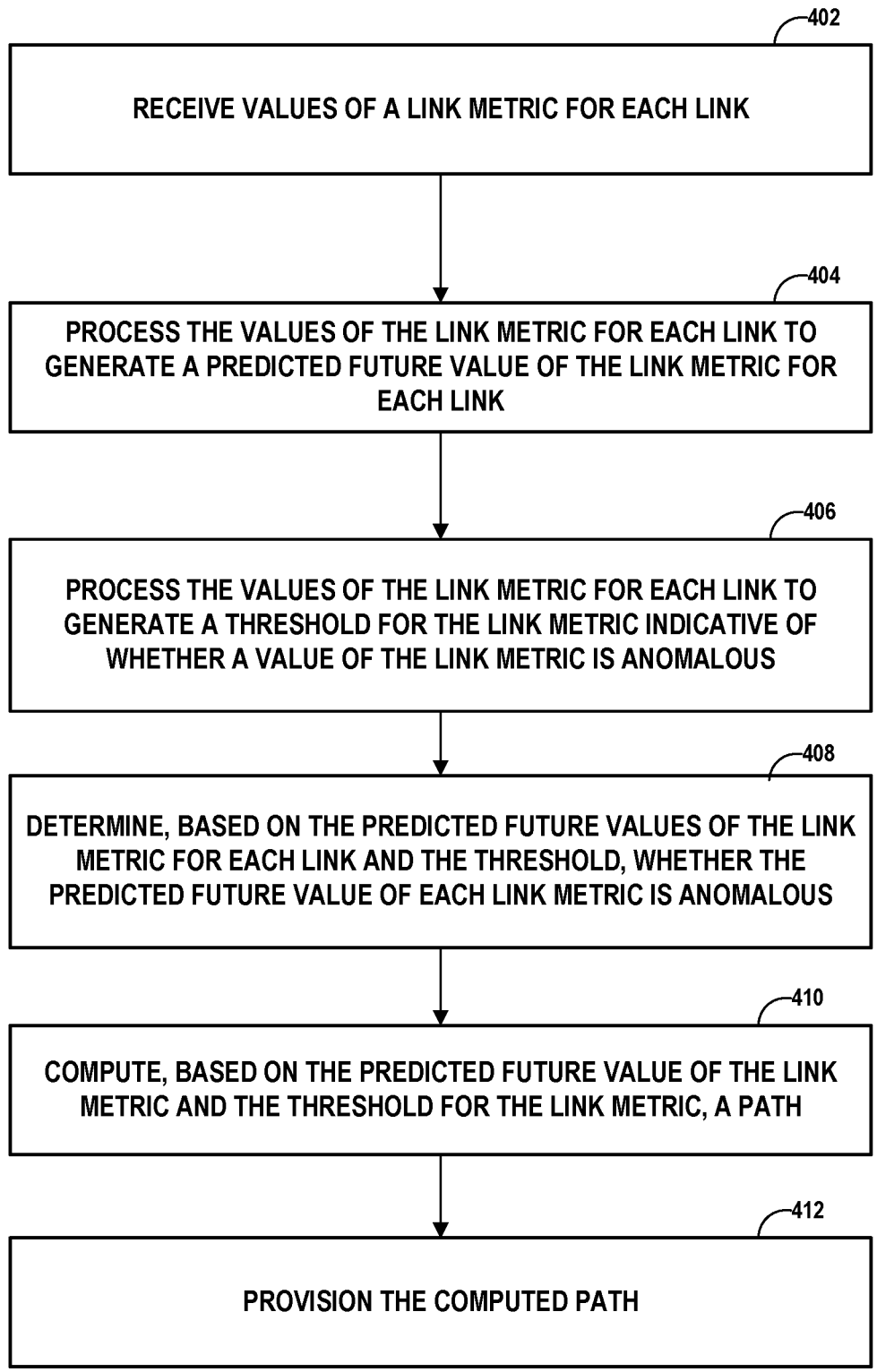
FIG. 4 is a flow diagram illustrating an example operation of a controller, in accordance with one or more techniques of this disclosure.

FIG. 4 is a flow diagram illustrating an example operation of a controller, in accordance with one or more techniques of this disclosure. For convenience, FIG. 4 is described with respect to controller 200 of FIG. 2. However, the operation of FIG. 4 is performed by controller 52 of FIG. 1 or controller 200 of FIG. 2.

In one example, control unit 102 receives values of a link metric for each link 9 of network 60 (402). For a given link 9, each value of the link metric is obtained during a different time interval than each other value of the values of the link metric. In some examples, the metric is latency, a number of transitions of the link from an "active" state to an "inactive" state over an interval of time, or an average downtime of the link over an interval of time. For example, control unit 102 may receive, for link 9A, values of a metric, each value taken at a different time, so as to depict a historical performance of the metric over a historical time period. Control unit 102 stores the values of the link metric within link information database 64.

Link metrics prediction module 62 executes a machine learning system. The machine learning system processes values of the link metric for each link 9 to generate a predicted future value of the link metric for each of links 9 (404). Further, the machine learning system processes values of the link metric for each link 9 to generate a threshold for the link metric (406). The threshold is indicative of whether a value of the link metric for each link 9 at a given time is anomalous. In some examples, the threshold is indicative of whether a predicted future value of the link metric for a link 9 is anomalous with respect to historical values of the link metric for the same link 9. In some examples, threshold is indicative of whether a predicted future value of the link metric for a link 9 is anomalous with respect to predicted future values of the link metric for other links 9 at the given time. Link metrics prediction module 62 provides the predicted future value of the link metric for each of links 9 and the threshold to path computation module 114.

Path computation module 114 determines, based on the predicted future value of the link metric for each of links 9 and the threshold, whether the predicted future value of the link metric for each link 9 is anomalous (408). In some examples, the threshold is indicative of whether a predicted future value of the link metric for a link 9 is anomalous with respect to historical values of the link metric for the same link 9. In some examples, threshold is indicative of whether a predicted future value of the link metric for a link 9 is anomalous with respect to predicted future values of the link metric for other links 9 at the given time. Further, path computation module 114 computes, based on the determination, path 12 (410). Path 12 includes at least some of links 9 and excludes at least one link 9 determined to be anomalous. As depicted in the example of FIG. 1, path 12 is a path between router 4B and router 4F, and includes links 9A, 9B, 9F, and 9I. Path provisioning module 118 provisions computed path 12 to enable a network device, such as one or more of routers 4, to forward network traffic along computed path 12 (412).

Figure 5:
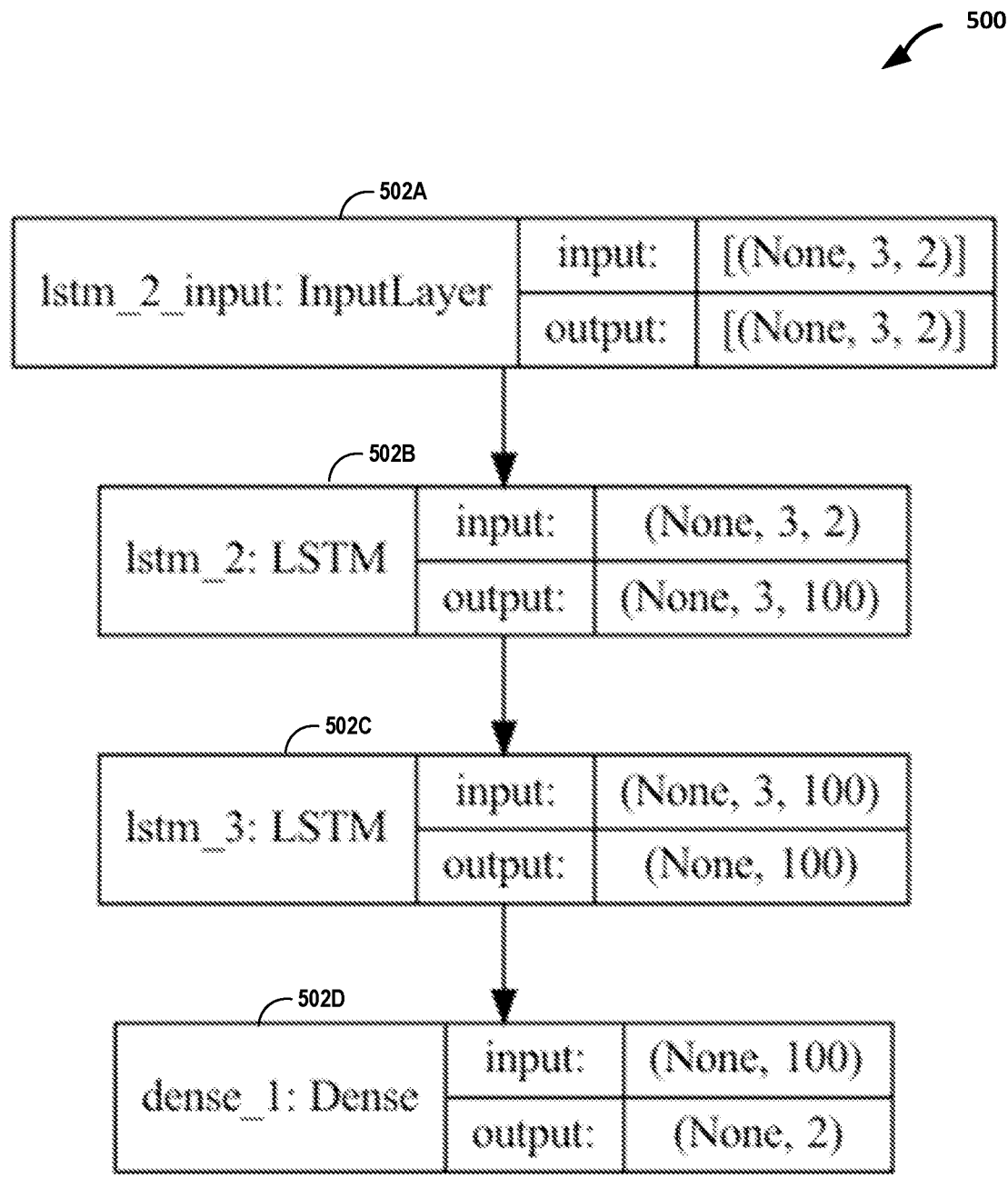
FIG. 5 is a block diagram illustrating an example deep learning architecture for generating a predicted future value of a link metric for a link and a dynamic threshold for the link metric, in accordance with one or more techniques of this disclosure.

FIG. 5 is a block diagram illustrating an example deep learning architecture 500 for generating a predicted future value of a link metric for a link 9 and a dynamic threshold for the link metric, in accordance with one or more techniques of this disclosure. In some examples, deep learning architecture 500 is an example of a deep learning system which may be implemented within link metrics prediction module 62 of FIG. 1 or link metrics prediction module 62 of FIG. 2.

As depicted in the example of FIG. 5, deep learning architecture 500 comprises a Stacked LSTM multivariate multiple parallel series model comprising a plurality of LSTM layers 502A-502D (hereinafter, "plurality of LSTM layers 502" or "plurality of layers 502"). Deep learning architecture 500 includes input layer 502A. Input layer 502A receives two input features: a number or count of transitions of the link 9 from an "active" state to an "inactive" state over each of one or more time intervals (e.g., a "flipcount") and a downtime of the link 9 over each of the one or more time intervals. In some examples, input layer 502A receives a number of transitions of the link 9 over each of a previous 3 time intervals and a downtime of the link 9 over each of the previous 3 time intervals. In some examples, each time interval is about 1 minute, 5 minutes, 15 minutes, etc. Input layer 502A maps the input features to two outputs.

Deep learning architecture 500 further includes intermediate layer 502B. Intermediate layer 502B receives the output of input layer 502A as an input and maps the input to, e.g., 100 units. For example, intermediate layer 502B receives, from input layer 502A, the features for the number of transitions of a link 9 and the amount of downtime of the link 9 for the previous 3 time intervals from input layer 502A. Intermediate layer 502C receives the output of intermediate layer 502B as an input and maps the input to, e.g., 100 units, which are provided to dense layer 502D. Dense layer 502D receives, as an input, the 100 node output of intermediate layer 502C and forecasts one or more features as an output. For example, dense layer 502D may forecast a number of transitions of a link 9 and an amount of downtime of the link 9 for a subsequent single time step or time interval (e.g., a future 1-minute, 5-minute, or 15-minute time interval).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    receiving, by processing circuitry of a computing system, values of a link metric for each link of a plurality of links of a network over a historical time period;
    processing, by a machine learning system executed by the processing circuitry, the values of the link metric for each link of the plurality of links to generate:
        1) a predicted future value of the link metric for each link of the plurality of links; and
        2) a threshold for the link metric for each link of the plurality of links, the threshold indicative of whether a value of the link metric at a given time is anomalous;
    determining, by the processing circuitry and based on the predicted future value of the link metric for each link of the plurality of links and the threshold, whether the predicted future value of the link metric for each link is anomalous;
    computing, by the processing circuitry and based on the determination, a path comprising one or more links from a group of candidate links, wherein the group of candidate links includes at least one link of the plurality of links for which a predicted future value is not determined to be anomalous based on the threshold, and does not include at least one link of the plurality of links for which the corresponding predicted future value of the link metric is determined to be anomalous; and
    provisioning, by the processing circuitry, the computed path to enable a network device to forward network traffic along the computed path.

2. The method of claim 1, wherein the machine learning system comprises a deep learning system configured to apply a plurality of hidden artificial neural network layers to the values of the link metric for each link of the plurality of links to generate the predicted future value of the link metric for each link and the threshold for the link metric.

3. The method of claim 2, wherein the deep learning system comprises a Long Short-Term Memory (LSTM) deep learning system.

4. The method of claim 1, wherein computing the path further comprises:
    applying, to each link of the group of candidate links selected from the plurality of links, a weight based on the determination of whether the predicted future value of the link metric for each link is anomalous; and
    selecting, based at least in part on the weight applied to each link of the group of candidate links, at least one link to include in the computed path.

5. The method of claim 4,
    wherein the method further comprises ordering the group of candidate links based on the applied weight, and
    wherein selecting the at least one link comprises selecting the link having the lowest applied weight.

6. The method of claim 1, wherein receiving the values of the link metric for each link of the plurality of links of the network comprises receiving, from a plurality of routers via Border Gateway Protocol (BGP) Link State (BGP-LS) advertisements, the values of the link metric for each link of the plurality of links of the network.

7. The method of claim 1, wherein the link metric comprises one or more of a latency, an amount of downtime over the historical time period, and a number of transitions from an active state to an inactive state over the historical time period.

8. The method of claim 1, wherein the link metric comprises each of a latency, an amount of downtime over the historical time period, and a number of transitions from an active state to an inactive state over the historical time period.

9. The method of claim 1, further comprising storing, by the processing circuitry and in a time-series database, a plurality of entries for each link of the plurality of links, wherein each entry of the plurality of entries for each link comprises:
    a value of the link metric for the link; and
    a time interval during which the value of the link metric for the link was obtained.

10. The method of claim 9,
    wherein the link metric comprises a plurality of metrics,
    wherein the plurality of metrics comprises two or more of a latency, an amount of downtime over the historical time period, and a number of transitions from an active state to an inactive state over the historical time period, and
    wherein the time-series database comprises a multivariate time-series database storing time-series data for each of the plurality of metrics.

11. The method of claim 1, wherein computing the path is based on detecting a change in the network, the change in the network comprising one or more of:
    an addition or removal of a link of the plurality of links; or
    an addition or removal of a network device of a plurality of network devices of the network.

12. The method of claim 1, wherein computing the path is performed on a predefined periodic basis.

13. The method of claim 1, wherein provisioning the computed path comprises providing the computed path to the network device to enable the network device to forward network traffic along the computed path.

14. The computing system of claim 13, wherein to receive the values of the link metric for each link of the plurality of links of the network, the processing circuitry is configured to receive, from a plurality of routers via Border Gateway Protocol (BGP) Link State (BGP-LS) advertisements, the values of the link metric for each link of the plurality of links of the network.

15. The method of claim 1, wherein the group of candidate links does not include any links for which the corresponding predicted future value of the link metric is determined to be anomalous.

16. A computing system comprising:
one or more storage devices; and
processing circuitry operably coupled to the one or more storage devices, the processing circuitry configured to:
  receive values of a link metric for each link of a plurality of links of a network over a historical time period;
  execute a machine learning system configured to process the values of the link metric for each link of the plurality of links to generate:
    1) a predicted future value of the link metric for each link of the plurality of links; and
    2) a threshold for the link metric for each link of the plurality of links, the threshold indicative of whether a value of the link metric at a given time is anomalous;
  determine, based on the predicted future value of the link metric for each link of the plurality of links and the threshold, whether the predicted future value of the link metric for each link is anomalous;
  compute, based on the determination, a path comprising one or more links from a group of candidate links, wherein the group of candidate links includes at least one link of the plurality of links for which a predicted future value is not determined to be anomalous based on the threshold, and does not include at least one link of the plurality of links for which the corresponding predicted future value of the link metric is determined to be anomalous; and
  provision the computed path to enable a network device to forward network traffic along the computed path.

17. The computing system of claim 16, wherein the machine learning system comprises a deep learning system configured to apply a plurality of hidden artificial neural network layers to the values of the link metric for each link of the plurality of links to generate the predicted future value of the link metric for each link and the threshold for the link metric.

18. The computing system of claim 16, wherein to compute the path, the processing circuitry is further configured to:
  apply, to each link of the group of candidate links selected from the plurality of links, a weight based on the determination of whether the predicted future value of the link metric for each link is anomalous; and
  select, based at least in part on the weight applied to each link of the group of candidate links, at least one link to include in the computed path.

19. Non-transitory, computer-readable media comprising instructions that, when executed, configure processing circuitry of a computing system to:
  receive values of a link metric for each link of a plurality of links of a network over a historical time period;
  execute a machine learning system configured to process the values of the link metric for each link of the plurality of links to generate:
    1) a predicted future value of the link metric for each link of the plurality of links; and
    2) a threshold for the link metric for each link of the plurality of links, the threshold indicative of whether a value of the link metric at a given time is anomalous;
  determine, based on the predicted future value of the link metric for each link of the plurality of links and the threshold, whether the predicted future value of the link metric for each link is anomalous;
  compute, based on the determination, a path comprising one or more links from a group of candidate links, wherein the group of candidate links includes at least one link of the plurality of links for which a predicted future value is not determined to be anomalous based on the threshold, and does not include at least one link of the plurality of links for which the corresponding predicted future value of the link metric is determined to be anomalous; and
  provision the computed path to enable a network device to forward network traffic along the computed path.

* * * * *